(12) United States Patent  (10) Patent No.: US 11,204,426 B2
Limberger et al.  (45) Date of Patent: Dec. 21, 2021

(54) METHOD FOR DETERMINING AN ADAPTIVE MODEL OF AN ELECTRON DENSITY DISTRIBUTION

(71) Applicant: Robert Bosch GmbH, Stuttgart (DE)

(72) Inventors: Marco Limberger, Ludwigsburg (DE); Markus Langer, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 16/482,171

(22) PCT Filed: Jan. 24, 2018

(86) PCT No.: PCT/EP2018/051676
§ 371 (c)(1),
(2) Date: Jul. 30, 2019

(87) PCT Pub. No.: WO2018/153601
PCT Pub. Date: Aug. 30, 2018

(65) Prior Publication Data
US 2019/0339395 A1  Nov. 7, 2019

(30) Foreign Application Priority Data
Feb. 23, 2017  (DE) .................... 10 2017 202 901.3

(51) Int. Cl.
*G01S 19/07* (2010.01)
*G01S 19/09* (2010.01)
(52) U.S. Cl.
CPC ............ *G01S 19/072* (2019.08); *G01S 19/09* (2013.01)
(58) Field of Classification Search
CPC ............................... G01S 19/072; G01S 19/09
(Continued)

(56) References Cited

U.S. PATENT DOCUMENTS

2015/0192678 A1* 7/2015 Chu ..................... G01S 3/74
342/357.39

FOREIGN PATENT DOCUMENTS

| CN | 103502844 A | 1/2014 |
|----|-------------|--------|
| JP | H09-171071 A | 6/1997 |
| JP | 2011-137698 A | 7/2011 |

OTHER PUBLICATIONS

Colombo, O. L. et al., "Extending Wide Area and Virtual Reference Station Networks Far Into the Sea With GPS Buoys," Sep. 2005, ION GNSS 2005 Meeting, Session B2, Paper 6 (13 pages).

(Continued)

*Primary Examiner* — Bo Fan
(74) *Attorney, Agent, or Firm* — Maginot, Moore & Beck LLP

(57) ABSTRACT

A method for determining a model of an electron distribution in the Earth's atmosphere in order to correct time-of-flight measurements of signals that are transmitted by earth satellites for position determinations with signal receivers includes determining local electron density data of provision sites and determining a local resolution accuracy as a function of the electron density data of the provision sites. The method further includes determining functions for interpolation of a distribution of the determined electron density data of the provision sites as a function of the determined resolution accuracy and compiling the model of the electron density distribution with the determined electron density data of the provision sites and the determined functions for interpolation.

9 Claims, 1 Drawing Sheet

(58) Field of Classification Search
USPC .................................. 342/352, 342, 357.39
See application file for complete search history.

(56) References Cited

OTHER PUBLICATIONS

Kitani, T. et al., "A Method to Improve Positioning Accuracy of GPS by Sharing Error Information among Neighbor Devices," Jun. 2012, Information Processing Society of Japan, IPSJ SIG Technical Report, vol. 2012-ITS-49 No. 2 (6 pages).
International Search Report corresponding to PCT Application No. PCT/EP2018/051676, dated Apr. 16, 2018 German and English language document) (6 pages).
Lang et al.; Multi-scale ionosphere model with data-adapted spatial resolution; 2014 XXXIth URSI General Assembly and Scientific Symposium; Aug. 16-23, 2014; 1 Page.
Dettering et al.; Combination of different space-geodetic observations for regional ionosphere modeling; Journal of Geodesy; Nov. 10, 2011; vol. 85, Issue 12; pp. 989-998.
Zeilhofer et al.; Regional 4-D modeling of the ionospheric electron density from satellite data and IRI; Advances in Space Research; Jun. 2, 2009; vol. 43; pp. 1669-1675; Elsevier Ltd, www.elsevier.com.

\* cited by examiner

METHOD FOR DETERMINING AN ADAPTIVE MODEL OF AN ELECTRON DENSITY DISTRIBUTION

This application is a 35 U.S.C. § 371 National Stage Application of PCT/EP2018/051676, filed on Jan. 24, 2018, which claims the benefit of priority to Serial No. DE 10 2017 202 901.3, filed on Feb. 23, 2017 in Germany, the disclosures of which are incorporated herein by reference in their entirety.

BACKGROUND

The disclosure relates to a method for determining an adaptive model of an electron density distribution in the atmosphere, particularly in the so-called ionosphere.

The ionosphere refers to a region of the upper atmosphere, which extends approximately between altitudes of 50 km and 1000 km and merges above into the plasmasphere. The ionosphere is distinguished by an increased concentration of charged particles, which is formed by ionization processes as a function of solar radiation. Depending on the frequency and strength of the ionization, electromagnetic signals in the ionosphere are refracted which may lead to time-of-flight delays. Various application fields are affected by this, for example satellite-assisted positioning and navigation. In the code and carrier phase observations of global satellite navigation systems (GNSS) such as the American GPS or European Galileo, depending on the state of the ionosphere the time-of-flight delay may lead to distance errors in the two-figure meter range. Particularly in safety-critical applications, accurate knowledge of the ionosphere in order to take the influence into account is of enormous importance. With the use of expensive geodetic dual-frequency receivers, signal combinations may be applied in order to eliminate the first-order ionosphere influence. Substantially more economical single-frequency receivers necessarily need to resort to atmospheric models in order to correct the signals and achieve accuracies <1 m.

For corresponding atmospheric models which are used for error correction in single-frequency receivers, the ionosphere products of the analysis centers of the International GNSS Service (IGS), which calculate and provide the integrated electron density, the so-called total electron content (TEC) as a function of longitude, latitude and time from observations of a global network with static GNSS reference stations, are known. GNSS users employ TEC values in order to correct the ionosphere influence in the measurements. Accordingly, the known atmospheric models for single-frequency receivers are based on position- and time-dependent TEC values which are determined by static reference stations. For geodetic positions lying between the reference stations, the position- and time-dependent TEC values are interpolated.

The parameterization and interpolation of the TEC is usually carried out with the aid of globally defined basis functions, for example spherical harmonics (SHs) or voxels, which expect a homogeneous data distribution and data quality. The degree and order of the SHs, or voxel sizes, and therefore the resolution capacity of the model, tends to be defined by the station distribution. In addition, fixed support points are assumed. Because of the inhomogeneous station distribution, the resolution of the TEC is consequently degraded by model smoothing, while detailed information in regions of dense observation distribution are lost. The GNSS user is provided with global, highly smoothed grid values with a resolution of 2.5° (~250 km) width×5° (~500 km) length×2 h.

The IGS network is represented by way of example in FIG. 1. The entered points denote the individual reference stations. The inhomogeneous station distribution coupled with significant data gaps are clear, and only in Europe can a narrow-meshed network be spoken of. In addition, the selection of the equipment (for example GNSS receiver, antenna, installation site) is typically at the responsibility of the station operator, and the data quality is very inhomogeneous. Accordingly, there are at present the following deficiencies which have a direct influence on the quality of the ionosphere products:

inhomogeneous station distribution,
inhomogeneous data quality,
use of globally defined, homogeneously distributed basis functions despite inhomogeneous database,
significant information loss by model smoothing in regions of dense station distribution (for example Europe),
regions without station coverage, i.e. no atmospheric information available, must be covered with very coarse model resolution.

The IGS network is selected here only by way of example. The listed deficiencies are likewise to be encountered with other GNSS ground station networks.

SUMMARY

Proposed here is a method for determining an adaptive model of an electron density distribution in the Earth's atmosphere. The model is used in order to correct time-of-flight measurements of signals that are transmitted by earth satellites for position determinations with signal receivers. The method comprises at least the following steps:
a) determining local electron density data of provision sites,
b) determining a local resolution accuracy as a function of a local density of provision sites,
c) determining functions for interpolation of the electron density data determined in step a) as a function of the resolution accuracy determined in step b),
d) compiling the model of the electron density distribution with the data determined in step a) and the functions determined in step c).

The (local) electron density in the ionosphere has a close relationship with a (local) ion density in the ionosphere. For this reason, the electron density or the ion density is resorted to in order to describe the ionosphere, depending on the context.

In step a), local electron density data of provision sites are determined. The local electron density data which are determined, evaluated and/or provided by the provision sites, are in this case preferably received and evaluated by an evaluation device in a data center in which the model of the electron density distribution is formed. To this end, the electron density data may be sent to the data center for example via a cable link and (stationary provision sites), a radio link and/or a satellite link.

The data for the electron density distribution may, in particular, be position- and time-dependent TEC values, and/or in particular position- and time-dependent parameters which allow direct deduction of TEC values. The electron density data are, particularly preferably, in particular position- and time-dependent function parameters with which an in particular four-dimensional model of an electron density distribution may be formed, in particular when the function parameters are put into a distribution function. If, for example, the so-called Chapman function is used as a distribution function, the position- and time-dependent function parameters may comprise at least the following parameters:

maximum electron density along the height,
the height at which this maximum electron density occurs, and
the associated scale height.

According to one advantageous configuration, it is proposed that the provision sites respectively comprise at least one dual-frequency signal receiver. Preferably, the dual-frequency signal receivers determine parameters which are representative of the description of the electron density along a signal propagation path from a satellite to a dual-frequency signal receiver, for instance in particular time-dependent TEC values in the region of the respective dual-frequency signal receiver. Furthermore, the provision sites may comprise evaluation and transmission units with which the parameters determined can be evaluated and forwarded to a data center in which the model of the electron density distribution is formed.

According to one advantageous configuration, it is proposed that local electron density data of stationary provision sites and/or mobile or moved (along a path on the Earth's surface) provision sites be determined in step a). Mobile provision sites are distinguished, in particular, in that they can be moved from one geodetic position to another geodetic position without dismantling the components forming them. As stationary provision sites, for example, the static permanent GNSS stations in reference networks such as the IGS network may be used.

Preferably, the mobile provision sites are arranged in or on (motor) vehicles. The use of vehicle-based provision sites, particularly in combination with stationary provision sites, for (concerted) calculation of corrections for ionospheric errors in position determination offers the particular advantage that it is possible to achieve sufficient temporal and spatial coverage that cannot be achieved only with stationary provision sites. By the movement of the vehicles, the distribution of the provision sites changes constantly, which may be taken into account by the (adaptive) model determined by means of the method and, in particular, by a (dynamic) redistribution of the basis functions.

In step b), a local resolution accuracy is determined as a function of a local density of provision sites. For example, the evaluation device of the data center may evaluate the geodetic positions of the provision sites in order to determine, or calculate, therefrom a local density of provision sites and/or a local resolution accuracy.

In step c), functions for interpolation of the electron density data determined in step a) as a function of the resolution accuracy determined in step b) are determined. This particularly advantageously makes it possible that an adaptive model, or a model which is adjusted in particular continuously to the existing observation situation, is provided by the proposed solution.

According to one advantageous configuration, it is proposed that the functions determined in step c) are localizing basis functions. For example, B-splines and/or voxels (grid points in a three-dimensional grid as node points) may be used as localizing basis functions. Localizing basis functions are distinguished, in particular, in that their support points and/or coverage regions can be adaptively adjusted to the spatial and temporal observation distribution. Preferably, the distribution of support points of the basis functions, in particular of B-spline support points and/or voxel sizes as a function of the resolution accuracy, or the quantity and/or quality of the observations, is determined in step c).

Preferably, the functions are determined in step c) in such a way that (respectively) adaptive regional modeling is carried out in one or more (spatial) region(s) with a dense observation distribution, or high resolution accuracy. Localizing basis functions are particularly suitable for the adaptive regional modeling. In the region with a dense observation distribution, there are (spatially concentrated) stationary provision sites and/or mobile provision sites with distances (so-called baselines) between observation sites in the two-figure km range. For the adaptive regional modeling in this region, each of the stationary provision sites and/or each of the mobile provision sites may be used for determination of the support points of the basis function(s) so that modeling-related smoothing of the electron density distribution can advantageously be reduced because of the dense and adaptive support point distribution of the basis function(s). Regions with a dense observation coverage may therefore be modeled with a high resolution, so that a high degree of detail can be achieved.

Adaptive regional modeling may likewise be carried out in one or more region(s) with a thin observation distribution, or low resolution accuracy. In the region with a thin observation distribution, there are a few provision sites in comparison with regions with a dense observation distribution. The density of provision sites, or the distance between individual provision sites, is in the range of several 100 km in regions with a thin observation distribution. Mobile provision sites may more particularly contribute to making the observation distribution denser in the region with a thin observation distribution. For the adaptive regional modeling in the region with a thin observation distribution, the mobile provision sites may be used in addition to the stationary provision sites as a calculation base for determination of the support points of the basis function(s). Preferably, the basis function(s) are adapted in the region with a thin observation distribution in such a way that data gaps can be bridged and the reduced information content can be utilized as well as possible.

In one or more region(s) with data gaps, a global background model may be used for the modeling of the electron density distribution. In other words, this means in particular that, in the proposed solution, one or more adaptive regional modeling(s) may be embedded into a (possibly nonadaptive) background model. In the region with data gaps, there are no or only very few stationary provision sites. Furthermore, in the region with data gaps, there are no or only very few mobile provision sites. Accurate quantitative evaluation of a data gap depends on the application of the model. In addition to the global background model, further satellite-assisted observation methods, for example radar altimetry, may be used for modeling the ion distribution in the region with data gaps.

Particularly in transition areas between regions with a thin observation distribution and regions with a dense observation distribution, smoothing functions may be used in order to be able to employ the increased accuracy due to the dense observation distribution as far as possible into regions with a thin observation distribution.

The model of the electron density distribution, determined by means of the method, may therefore be based on a so-called "patch" method in which a global background model is combined with regional densifications or regional modelings. The global background model may, for example, use spherical harmonics and/or voxel approaches in order to describe an in particular smoothed, interpolated global electron density distribution.

Preferably, the functions determined in step c) are localizing polynomial B-splines. With these functions, the validity range and therefore the localization range may be varied with the distribution of the support points. As an alternative or in addition, a voxel approach may be selected. In this case, the voxel vertices may be interpreted as support points, so that the size and number of the voxels may be varied according to the observation base.

In step d), the model of the electron density distribution is compiled with the data determined in step a) and the functions determined in step c). Furthermore, at least one distribution function, in particular a so-called Chapman or Epstein function, with which an estimation of the distribution of the electron density as a function of height is possible, may be used for the compilation of the model. Preferably, a four-dimensional electron density model, and/or a model for time-dependent description of the electron density distribution in all three spatial directions, is compiled in step d).

According to another advantageous configuration, it is proposed that correction data, which are provided to a multiplicity of single-frequency and dual-frequency signal receivers, be determined with the model of the electron density distribution. By means of the correction data, ionosphere models stored in the respective single-frequency signal receiver may be corrected and/or updated. In dual-frequency receivers, the ionosphere corrections may, for example, be used for improved integrity concepts or more rapid resolution of the phase ambiguities and therefore to achieve shorter convergence times. Corresponding signal receivers may for example be arranged on or in (motor) vehicles, ships, buoys, agricultural equipment or machines, portable GNSS receivers, cell phones or other electronic articles.

Also intended to be described here are a device for carrying out the described method, as well as a corresponding computer program and a machine-readable storage medium on which this computer program is stored. A device for carrying out the described method is conventionally implemented in a data center or a similar structure. Local electron density data are received and processed here according to the described method.

BRIEF DESCRIPTION OF THE DRAWINGS

The solution proposed here, as well as its technical context, will be explained in more detail below with the aid of the figures. It should be pointed out that the disclosure is not intended to be restricted by the exemplary embodiments presented. In particular, unless explicitly explained otherwise, it is also possible to extract partial aspects of the facts explained in the figures and combine them with other components and/or knowledge from other figures and/or the present description. Schematically.

DETAILED DESCRIPTION

Figure 1:
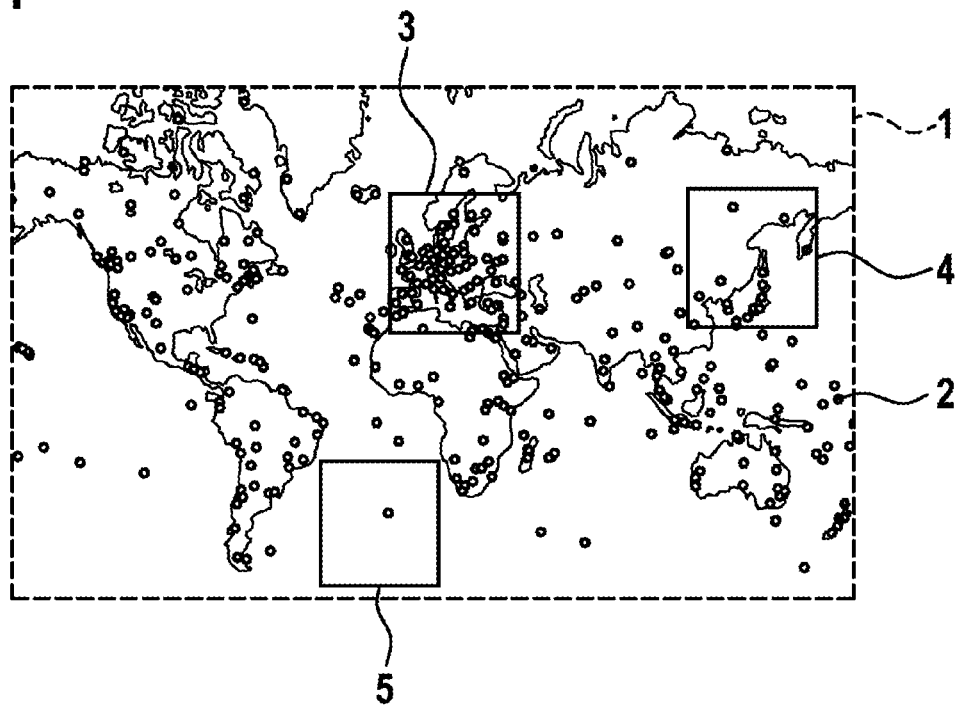
FIG. 1 shows a map view with the station distribution of the IGS network.

FIG. 1 schematically shows a map view 1 in which the station distribution of the IGS network is illustrated. The IGS network is presented by way of example here since its stations 2 may be used in connection with the solution proposed here as stationary provision sites, from which ion distribution data may be determined. Various observation scenarios are highlighted in FIG. 1, namely regions 3 with a dense observation distribution, regions 4 with a thin observation distribution and regions 5 with significant data gaps 5.

Figure 2:
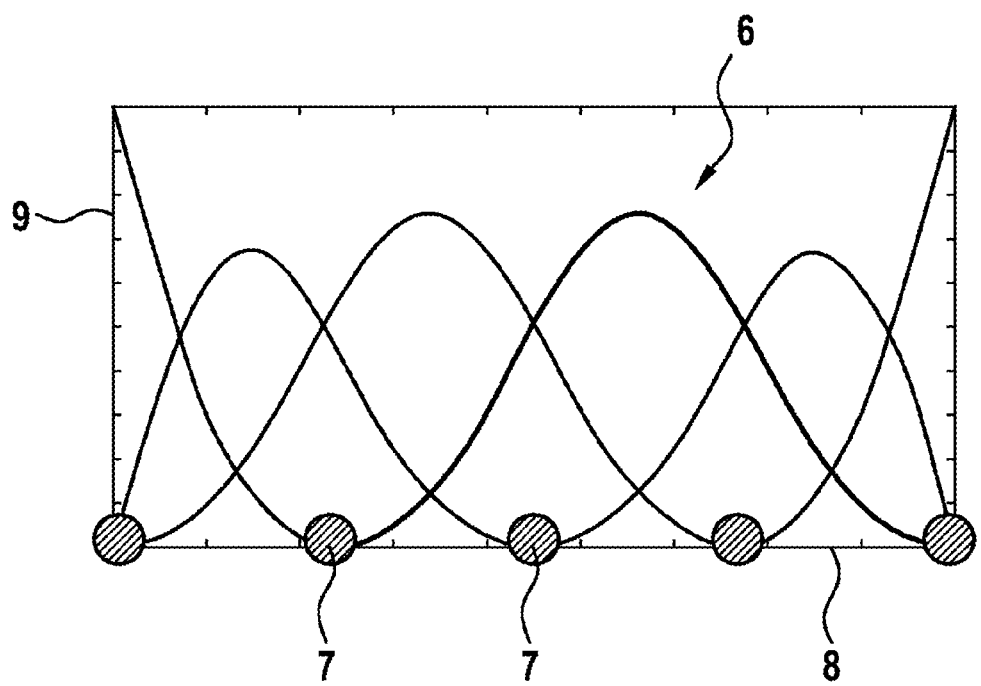
FIG. 2 shows a representation of polynomial B-splines which may be used in the solution proposed here.

FIG. 2 schematically shows a representation of polynomial B-splines 6, which may be used in the solution proposed here in order to interpolate the electron density data which have been found as a function of the resolution accuracy which has been determined. FIG. 2 shows by way of example localizing polynomial B-splines with homogeneously distributed support points 7. In connection with the solution proposed here, the support points 7 may be formed by the stationary provision sites and/or by the mobile provision sites.

In FIG. 2, the latitude 8 is plotted on the abscissa and B-spline values 9 are plotted on the ordinate. According to the representation in FIG. 2, five support points 7 have been arranged homogeneously distributed by way of example in a region from −60° to +30° latitude 8. The validity range of the individual functions, or curves, and therefore the localization range, varies with the distribution of the support points 7. In connection with the solution proposed here, which provides an adaptive model of the ion distribution in the Earth's atmosphere, the number and position of the support points 7 may then be varied in such a way that the number of support points is increased in regions with dense observation coverage and reduced in regions with few observations. Thus, a narrow localization range as well as an increased resolution capacity may be adjusted in regions with dense observation coverage, and a wide localization range and a reduced resolution capacity, or increased smoothing, may be adjusted in regions with few observations.

The B-splines 6 are localizing, i.e. non-zero only in a finite interval. In the proposed solution, the support points 7 of the B-splines 6 may be adjusted continuously to the existing observation situation, or to the current (geodetic) positions of the stationary provision sites and/or of the mobile provision sites. Because of the interpolation at the region edges and the finite support range, polynomial B-splines are outstandingly suitable for the regional modeling which is carried out in connection with the proposed solution on the basis of the local electron density distribution.

The proposed solution allows, in particular, the following advantages:
- an increased accuracy in the position determination, in particular by a reduction of the modeling-related smoothing in regions with a high support point density.
- GNSS users, in particular those who only have a single-frequency signal receiver, profit from improved accuracies of the ionosphere parameters by adaptive spatial and temporal resolutions.
- Because of the increased resolution factor of the model, besides the ionospheric climatology, i.e. periodic effects such as variation of the ionosphere activity with the solar 11-year cycle, annual and seasonal variations, diurnal variation, it is also possible to pick up highly dynamic irregular phenomena such as (medium- and large-scale) traveling ionospheric disturbances (TIDs, MSTIDs, LSTIDs), sudden ionospheric disturbances (SIDs), spread F-layer, sporadic E-layer, ionospheric storms, and/or scintillations. Such effects are lost in currently available ionosphere products because of their rigid resolution capacity and the degree of smoothing associated therewith, or are not picked up in regions with sparse station coverage.

The (adaptive) model approach is described here in the scope of ionosphere modeling, but may be employed in many application fields, for example for modeling of the troposphere with GNSS observations, use of magnetometer measurements in vehicles for modeling of the magnetic field, or modeling of the Earth's gravitational field.

The invention claimed is:

1. A method for determining a model of an electron density distribution in Earth's atmosphere in order to correct time-of-flight measurements of signals that are transmitted by earth satellites for position determinations by a signal receiver, the method comprising:
   determining local electron density data of provision sites using an evaluation device;
   determining a local resolution accuracy as a function of the determined local electron density data of the provision sites using the evaluation device;
   determining functions for interpolation of a distribution of the determined local electron density data of the provision sites as a function of the determined local resolution accuracy using the evaluation device;
   compiling the model of the electron density distribution with the determined local electron density data of the provision sites and the determined functions for interpolation using the evaluation device;
   correcting the time-of-flight measurements of the signals based on the compiled model using the evaluation device; and
   determining a position on the Earth of the signal receiver based on the corrected time-of-flight measurements using the signal receiver.

2. The method as claimed in claim 1, wherein the provision sites respectively include at least one dual-frequency signal receiver.

3. A method for determining a model of an electron density distribution in Earth's atmosphere in order to correct time-of-flight measurements of signals that are transmitted by earth satellites for position determinations by a signal receiver, the method comprising:
   determining local electron density data of provision sites using an evaluation device;
   determining a local resolution accuracy as a function of the determined local electron density data of the provision sites using the evaluation device;
   determining functions for interpolation of a distribution of the determined local electron density data of the provision sites as a function of the determined local resolution accuracy using the evaluation device;
   compiling the model of the electron density distribution with the determined local electron density data of the provision sites and the determined functions for interpolation using the evaluation device;
   correcting the time-of-flight measurements of the signals based on the compiled model using the evaluation device; and
   determining a position on the Earth of the signal receiver based on the corrected time-of-flight measurements using the signal receiver,
   wherein the determination of the local electron density data includes determining local electron density distributions of mobile provision sites.

4. The method as claimed in claim 3, wherein the mobile provision sites are arranged in or on vehicles.

5. The method as claimed in claim 1, wherein the determined functions for interpolation are localizing basis functions.

6. The method as claimed in claim 1, further comprising:
   determining correction data provided to a multiplicity of GNSS signal receivers with the model of the electron density distribution.

7. A device for determining a model of an electron density distribution, comprising:
   an evaluation device configured to determine the model of the electron density distribution in Earth's atmosphere in order to correct time-of-flight measurements of signals that are transmitted by earth satellites for position determinations by signal receivers, the evaluation device configured to:
   determine local electron density data of provision sites;
   determine a local resolution accuracy as a function of the determined local electron density data of the provision sites;
   determine functions for interpolation of a distribution of the determined local electron density data of the provision sites as a function of the determined local resolution accuracy; and
   compile the model of the electron density distribution with the determined local electron density data of the provision sites and the determined functions for interpolation.

8. The method as claimed in claim 1, wherein a computer program is configured to carry out the method.

9. The method as claimed in claim 8, wherein the computer program is stored in a machine-readable storage medium.

* * * * *

UNITED STATES PATENT AND TRADEMARK OFFICE
CERTIFICATE OF CORRECTION

PATENT NO. : 11,204,426 B2
APPLICATION NO. : 16/482171
DATED : December 21, 2021
INVENTOR(S) : Limberger et al.

It is certified that error appears in the above-identified patent and that said Letters Patent is hereby corrected as shown below:

On the Title Page

On Page 2, in Item (56), under "OTHER PUBLICATIONS": "Dettering et al." should read --Dettmering et al.--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*